United States Patent
Tsunoda et al.

[11] Patent Number: 5,984,438
[45] Date of Patent: Nov. 16, 1999

[54] RUBBER TRACK

[75] Inventors: Katsuhiko Tsunoda, Yokohama; Shingo Kato, Tokyo; Yoshihide Fukahori, Hachioji, all of Japan

[73] Assignee: Bridgestone Corporation, Tokyo, Japan

[21] Appl. No.: 08/839,303

[22] Filed: Apr. 18, 1997

[30] Foreign Application Priority Data

| May 16, 1996 | [JP] | Japan | 8-148172 |
| May 16, 1996 | [JP] | Japan | 8-148173 |
| Aug. 7, 1996 | [JP] | Japan | 8-224567 |

[51] Int. Cl.⁶ .................................................. B62D 55/24
[52] U.S. Cl. .......................................... 305/169; 305/179
[58] Field of Search ..................................... 305/160, 167, 305/169, 175, 176, 177, 178, 179, 195, 199

[56] References Cited

U.S. PATENT DOCUMENTS 5,447,365  9/1995  Muramatsu et al. .

FOREIGN PATENT DOCUMENTS 55-55065  4/1980  Japan ..................................... 305/177
55-72468  5/1980  Japan ..................................... 305/177

*Primary Examiner*—Russell D. Stormer
*Attorney, Agent, or Firm*—Oliff & Berridge, PLC

[57] ABSTRACT

There is provided a rubber track used for an undercarriage of a vehicle, and particularly an improvement in a guide lug which protrudes from an inner peripheral surface of the rubber track. In the rubber track in which a plurality of rubber lugs are formed on an outer peripheral surface of an endless rubber elastic body and a plurality of guide lugs are formed on an inner peripheral surface of the elastic body, the guide lugs being used for transmission of driving force or prevention of detracking between the guide lugs, and track rollers, idlers or sprockets, a heat-resisting thermoplastic resin member having low friction properties, a heat-resisting thermosetting resin member having low friction properties, or a resin member having a Barcol hardness (A type) of 40 degrees or less is exposed at one or more surfaces of each of the guide lugs, the surface or surfaces contacting other member.

20 Claims, 8 Drawing Sheets

RUBBER TRACK

BACKGROUND OF THE INVENTION

1. Field of the Invention

The present invention relates to a rubber track used for an undercarriage of a vehicle, and particularly to an improvement in a guide lug which protrudes from an inner peripheral surface of a rubber track.

2. Description of the Related Art

Generally, guide lugs are formed at equal pitch on the inner peripheral surface along the longitudinal direction of the rubber track. The functions of these guide lugs are to transmit the driving force from a sprocket to the rubber track and to prevent detracking of the rubber track from track rollers, i.e., to prevent the rubber track from coming-off of track rollers.

Particularly, when the rubber track is shifted laterally against track rollers due to lateral force, the track rollers and the guide lugs repeatedly contact each other and the force to bring the rubber track back to the original position is generated. In these cases, the friction between the guide lugs and track rollers causes detracking, and further, abrasion or breakage of the guide lugs.

FIGS. 14 and 15 each show an inner peripheral surface of a rubber track 11 in the state described above. FIG. 14 shows a structure in that a plurality of pairs of guide lugs 12, 12 are formed to protrude from an endless rubber elastic body.

A track roller 20 usually rolls straddling these guide lugs 12, 12. When the rubber track 11 is shifted laterally against the track roller 20, the track roller 20 contacts the guide lugs 12, 12 as indicated by the dotted line (only one side is shown) and further shift of the track roller 20 is restricted and the track roller 20 is brought back to its original rolling contact surface.

For this reason, large frictional force is applied particularly to outer side surfaces of the guide lugs 12, 12 and the rubber track is apt to detrack from the track rollers. And in some cases, abrasion or breakage may occur in the guide lugs.

On the other hand, FIG. 15 shows a rubber track having plurality of guide lugs 12 formed in a protruding manner on a single line along the longitudinal direction of the rubber track. In the same way as in the structure shown in FIG. 14, when the track roller 20 is shifted from a normal rolling position, the track roller 20 repeatedly contacts the guide lugs 12 as indicated by the dotted line to prevent the shift of the track roller 20. In this case as well, the rubber track is apt to detrack from the track rollers 20. According to circumstances, abrasion or breakage may occur in the guide lugs.

Further, when these guide lugs 12 are engaged with an unillustrated sprocket and are used for transmission of driving force, a sprocket pin and each guide lug 12 are constantly in a state of being rubbed against each other so that a base portion of the guide lug 12 particularly deforms. For this reason, not only the rubber track is apt to detrack from the track roller, but also abrasion or breakage is apt to occur in the base portion of the guide lugs 12. Particularly, when the guide lugs 12 are each formed of rubber, there is a strong tendency toward occurrence of these states.

In addition, when the track roller 20 contacts the guide lugs 12, large running resistance is generated and energy loss is thereby caused.

SUMMARY OF THE INVENTION

The present invention has been devised in light of the above prior arts and an object of the present invention is to provide a special structure of guide lugs protruding from an inner peripheral surface of a rubber track so as to lessen occurrence of the rubber track being detracked from track rollers and protect these guide lugs from being abraded, deformed or broken and to provide a member which can resist an increase in the surface temperature of each guide lug, caused by friction during the operation of a vehicle, in a state in which the member is connected integrally with the guide lug.

In order to achieve the above-described object, in accordance with a first aspect of the present invention, there is provided a rubber track in which a plurality of rubber lugs are formed on an outer peripheral surface of an endless rubber elastic body and a plurality of guide lugs are formed on an inner peripheral surface of the elastic body, the guide lugs being used for transmission of driving force or prevention of disengagement between the guide lugs and a track roller, wherein a resin member is exposed at a surface of each of the guide lugs, the surface contacting other member.

The material of the resin member may be a heat-resistant thermoplastic resin which has low friction properties. In this case, it is preferable that the heat-resisting thermoplastic resin member has a melting point of 200° C. or higher. A preferred example of this resin material is nylon.

Further, the material of the resin member may be a heat-resistant thermosetting resin which has low friction properties. In this case, it is preferable that the heat-resisting thermosetting resin has a thermal decomposition temperature of 200° C. or over. A preferred material of this resin member is bakelite.

Further, preferably, the guide lugs are each made of rubber, and the rubber track is formed in such a manner that, by setting the resin member in a mold for forming the rubber track and by filling the mold with rubber material, the resin member and the guide lug are integrated with each other.

Moreover, the resin member preferably has any one of rod-shaped, plate-shaped, cylinder-shaped, board-shaped, and dumbbell-shaped configurations.

The present invention has the above-described structure, and particularly, in the guide lugs which constantly engage with track rollers, a heat-resistant thermoplastic or thermosetting resin member having low friction properties is exposed at one or more surfaces of the guide lug, the surface or surfaces repeatedly contacting other member such as the track rollers.

Accordingly, a rubber track which has improved anti-detracking ability and less abrasion at guide lugs and low running resistance is obtained.

Particularly, by selecting a resin member which can resist an increase in the surface temperature of the guide lug, which is caused by friction, the above effects become more remarkable.

Namely, a turning traveling test was carried out at a speed of 25 km/hr and at a turning radius of 15 m by using a vehicle in which four positive-drive type rubber track are installed, and the surface temperature of the guide lugs was measured every ten minutes during the test. As a result, in the case of the rubber track having no resin members, it was found that the surface temperature increased up to 180° C. forty minutes after the traveling test started.

Accordingly, in the present invention, a heat-resisting thermoplastic or thermosetting resin member having low friction properties, of which melting point and thermal decomposition temperature (i.e., a temperature causing a chemical change in a short period) are also 200° C. or over, is used.

Examples of the thermoplastic resin particularly selected in the present invention include nylon, aromatic nylon, polycarbonate, glass fiber reinforced polyethylene terephthalate, glass fiber reinforced polybutylene terephthalate, polyphenylene, polyphenylene oxide, polyphenylene sulfide, polysulfone, polyimide, polyamide-imide, polyamide-bismaleimide, polyoxybenzilene, polyarylate, polyether ketone, polyethersulfone, polyethylene terephthalate, and the like. Further, the above-described resins may be used in such a manner as to be reinforced by glass fibers or the like.

Further, examples of the thermosetting resin particularly selected in the present invention include phenol resin (bakelite), urea resin, melamine resin, unsaturated polyester resin, aryl resin, epoxy resin, and the like. Further, these resins may be used in such a manner as to be reinforced by cotton, paper, cloth, glass fibers, asbestos, or the like.

The above-described structure lessens an occurrence of the detracking and allows the guide lug to be effectively protected from being worn out, deforming, being broken, or the like. Accordingly, breakage (abrasion or cutting) of the guide lugs at the time of traveling at a high speed or generation of heat is largely alleviated, thereby allowing great improvement in durability of the rubber track itself.

As described above, the present invention is excellent, but when bakelite, FRP, or the like is used as the above-described resin member, there may possibly exist some problems in that scraping or abrasion occurring in a sprocket, idler, a track roller, or the like, contacting and interfering with the resin member, is promoted, and vibration and noise generated when the resin member contacts and interferes with the sprocket, idler, or track roller becomes noticeable.

FIG. 16 shows a state of a track roller and a rubber track having a plurality of guide lugs 12 disposed on a single line (see FIG. 15), in which a scraped and abraded state of the rotating wheel is shown. A resin member 13 is located on a side surface of the guide lug 12 of the rubber track, and therefore, inner side portions $20_1$, $20_2$ of a track roller 20 which contact the resin member 13 are mainly scraped and abraded. As a result, there is a possibility that vibration and noise are generated.

Accordingly, further objects of the present invention are to further improve a guide lug which is used for driving of the rubber track, and particularly to further improve a resin member embedded in the guide lug, thereby alleviating scraping or abrasion occurring in a sprocket, idler, or track roller, contacting and interfering with the resin member, and reducing vibration and noise generated when the resin member contacts and interferes with the sprocket, idler, or track rollers.

In order to achieve the above further objects, in accordance with a second aspect of the present invention, a resin member having a Barcol hardness (A type) of 40 degrees or less is used as the above-described resin member. The Izod impact strength thereof is preferably 2.0 or over. Preferred examples of the material for such resin member are selected from a group constituted from nylon 6, nylon 6,6, polyurethane, polyacetal, and polypropylene.

In the same way as in the first aspect, in the second aspect of the present invention as well, preferably, guide lugs are made of rubber, and a rubber track is formed in such a manner that, by setting the resin member within a mold for forming the rubber track and by filling the mold with rubber material, the resin member is integrated with the guide lug.

Further, in the same manner as in the first aspect, the resin member preferably has any one of rod-shaped, plate-shaped, cylinder-shaped, board-shaped, dumbbell-shaped and other arbitrary configurations.

The second aspect of the present invention is, in the same way as in the first aspect, constructed in that in the guide lugs constantly engaging the track rollers, the above-described resin member is exposed at one or more surface portions of the guide lug, which repeatedly contacts other component such as the track roller. For this reason, an improvement against the detracking which is caused particularly when the track rollers and guide lugs are controlling the shift of the position therebetween is made in the rubber track due to a decrease in coefficient of abrasion of guide lugs. Further, a rubber track in which an amount by which the guide lugs are worn out is small and of which running resistance is also small is obtained. Moreover, by using the resin member of which Barcol hardness (A type) is 40 degrees or less (base on JISK7060), preferably 30 degrees or less, and more preferably 20 degrees or less, vibration and noise can be reduced and breakage of a component on a vehicle body side, which contacts the resin member, can be prevented. When the Barcol hardness of the resin member exceeds 40 degrees, the components on the vehicle body side, which contacts the resin member, are apt to be broken. It is desirable that the Izod impact strength (based on JISK6911) is 2.0 or more from the standpoint of the durability of the resin member. When the Izod impact strength is less than 2.0, there is a possibility that the resin member is broken in an early stage of its usable duration due to the resin member contacting the vehicle body components.

Examples of the resin member which can be used in the second aspect of the present invention include nylon 6, nylon 6,6, polyurethane, polyacetal, polypropylene, polyethylene terephthalate, polybutylene terephthalate, polycarbonate, polystyrene, acrylonitrile-butadiene-styrene copolymer resin, polyvinyl chloride, polyvinyl acetate, and the like. Among these resins, nylon 6, nylon 6,6, polyurethane, polyacetal, and polypropylene are preferably used. Meanwhile, so long as the Barcol hardness and Izod impact strength of the resin member are respectively set in predetermined ranges, a resin reinforced by glass fibers may also be used.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

The present invention will be hereinafter described in detail on the basis of embodiments thereof.

Figure 1:
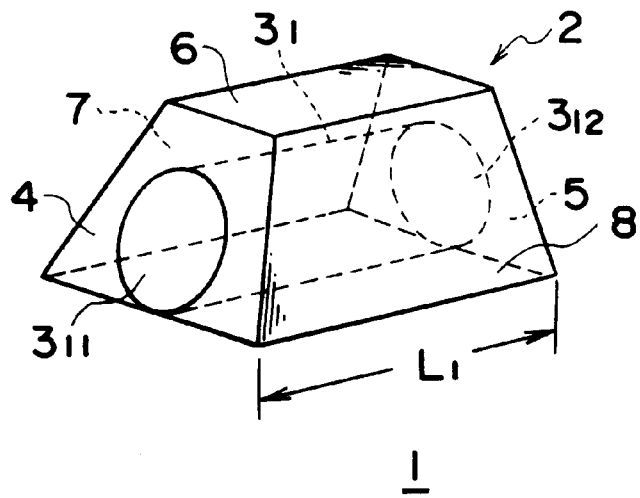
FIG. 1 is a perspective view showing a first example of a rubber track according to the present invention with a guide lug of the rubber track being specifically shown in a taken-out state.
Figure 2:
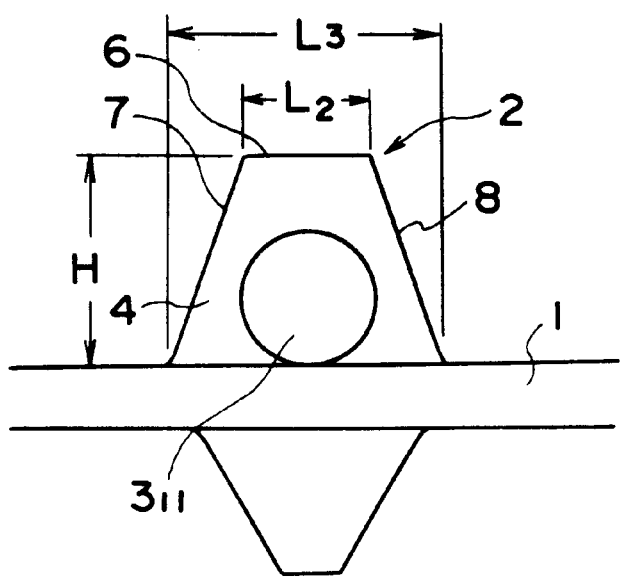
FIG. 2 is a side view of the guide lug and its vicinities shown in FIG. 1.

FIG. 1 shows a first example of a rubber track of the present invention and is a perspective view of a guide lug 2. FIG. 2 is a side view of the guide lug 2 and its vicinities. The guide lug 2 has a heightwise dimension (H) of 30 mm from an inner peripheral surface of a rubber 1 which forms a rubber track. A length of one side of the guide lug 2 ($L_1$) in a transverse direction of the rubber track is 60 mm, a length of a top portion of the guide lug 2 ($L_2$) in a longitudinal direction of the rubber track is 25 mm, and a length of a base portion of the guide lug 2 ($L_3$) in the longitudinal direction of the rubber track is 55 mm. Two pairs of facing side surfaces 4, 5 and 7, 8 in the guide lug 2 in the transverse and longitudinal directions of the rubber track are respectively formed at desired inclinations.

A rod-shaped body $3_1$ having a circular cross sectional configuration whose diametrical dimension is 20 mm is embedded in the guide lug 2 in such a manner as to extend in the transverse direction of the rubber track. In a preferred embodiment, the rod-shaped body $3_1$ is made of nylon being heat-resisting thermoplastic resin member having low friction properties, a bakelite being thermosetting resin, or a nylon 6,6 member having Barcol hardness of three degrees and Izod impact strength of 10. Both ends $3_{11}$, $3_{12}$ of the rod-shaped body $3_1$ are respectively exposed at side surfaces 4, 5 of the guide lug 2. In order that the rod-shaped body $3_1$ be embedded in the guide lug 2, a mold, with a recess portion formed therein, for forming the guide lug 2 is used, the rod-shaped body $3_1$ is fitted into the recess portion, and with this state being maintained, a rubber material 1 which forms a base body of the rubber track fills the mold. The guide lug 2 and the rod-shaped body $3_1$ are integrated with each other in such a manner as to be adhered by vulcanization process of the rubber 1.

Meanwhile, as occasion demands, a phenol adhesive, epoxy adhesive, rubber adhesive and the like may be used alone or in combination of two or more of them for adhesion by vulcanization.

As shown in FIGS. 1 and 2, both ends $3_{11}$, $3_{12}$ of the rod-shaped body $3_1$ are respectively exposed at the side surfaces 4, 5 of the guide lug 2 and when the guide lug 2 contacts a track roller, or unillustrated idler, sprocket or the like, one of these ends $3_{11}$, $3_{12}$ contact the track roller or the like. As the rod-shaped body $3_1$ has low friction properties, the possibility of detracking is lessened, the occurrence of abrasion or breakage of the guide lug are lowered and running resistance is remarkably reduced. Further, when the rod-shaped body $3_1$ is used which is made of a nylon 6,6 resin having Barcol hardness of 3 degrees and an Izod impact strength of 10, vibration and noise is reduced still further. Meanwhile, the ends $3_{11}$, $3_{12}$ of the rod-shaped body $3_1$ may be provided to protrude from the side surfaces 4, 5 by 5 mm or less. In this case, only these ends contact and interfere with the track roller, and therefore, abrasion and breakage of the rubber part of the guide lug can be prevented.

Figure 3:
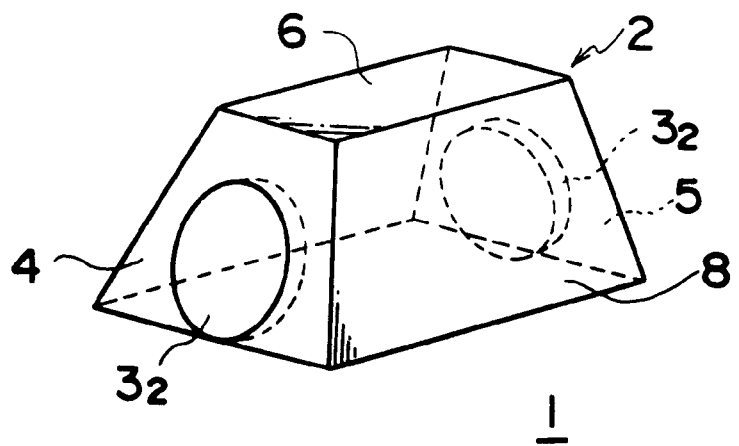
FIG. 3 is a perspective view showing a second example of a rubber track according to the present invention with a guide lug and its vicinities of the rubber track being specifically shown in a taken-out state.

FIG. 3 is a second example of the rubber track of the present invention and shows a structure in that disk-shaped resin members $3_2$ (made of nylon, bakelite, or nylon 6,6) each of which diameter is 20 mm and thickness is 5 mm are embedded in the guide lug 2 with one side surfaces thereof being respectively exposed at the side surfaces 4, 5 of the guide lug 2. In this case as well, during vulcanization of the rubber material 1, the resin members $3_2$ are set in the concave portion of the metallic mold and are subjected to adhesion by vulcanization.

Figure 4:
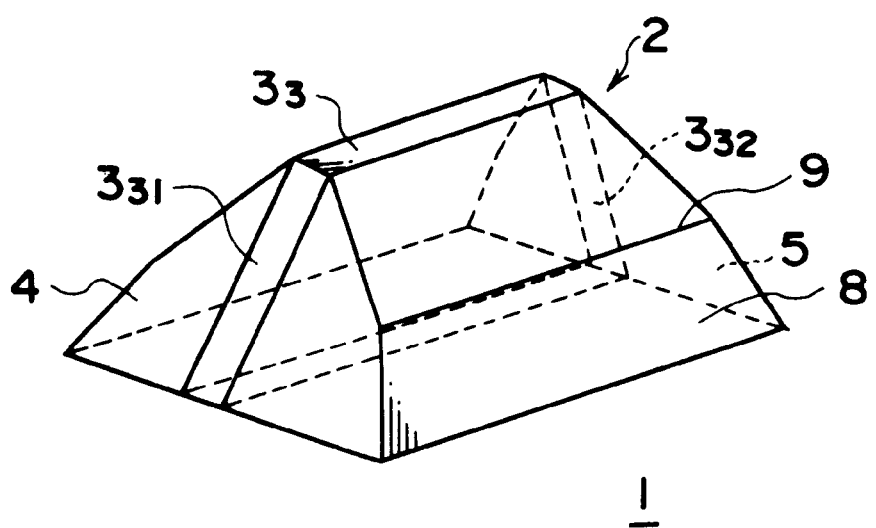
FIG. 4 is a perspective view showing a third example of a rubber track according to the present invention with a guide lug of the rubber track being specifically shown in a taken-out state.
Figure 5:
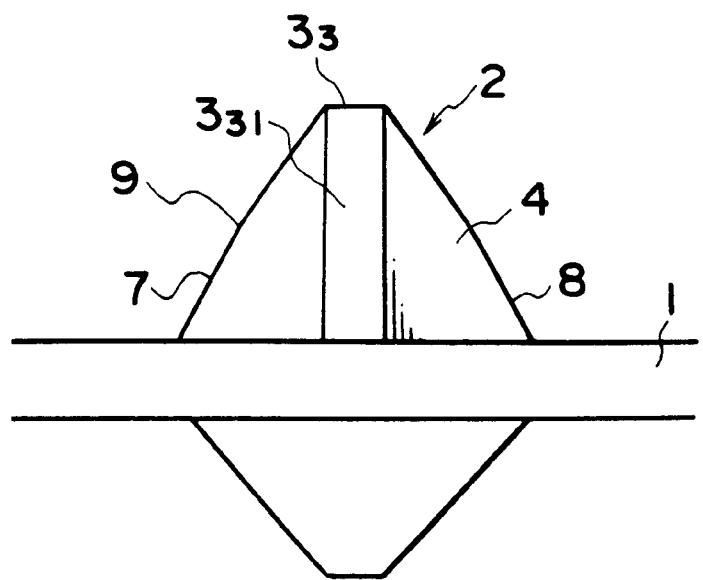
FIG. 5 is a side view of the guide lug and its vicinities shown in FIG. 4.

FIG. 4 is a perspective view of a guide lug 2 as a third example of the rubber track of the present invention, and FIG. 5 is a side view of the guide lug 2. In this example, a resin plate $3_3$ having a flat-plate shape (made of nylon, bakelite, or nylon 6,6) is embedded in the center of the guide lug 2 in a widthwise direction thereof. Both ends $3_{31}$, $3_{32}$ of the resin plate $3_3$ are respectively exposed at the side surfaces 4, 5 of the guide lug 2. The thickness of the resin plate $3_3$ is 10 mm and the resin plate $3_3$ is integrated with the rubber material 1 by adhesion by vulcanization. Meanwhile, in this example, the facing side surfaces 7, 8 of the guide lug 2 are each formed as a two-stage inclined surface.

The guide lug 2 is formed in that a widthwise dimension of a top surface thereof in the longitudinal direction of the rubber track is 10 mm, a widthwise dimension of a base portion thereof in the longitudinal direction of the rubber track is 60 mm, and a heightwise dimension thereof (H) is 40 mm. A bent portion 9 is formed on each of the side surfaces 7, 8 of the guide lug 2 at a position of 15 mm apart from the top of the guide lug 2.

Figure 6:
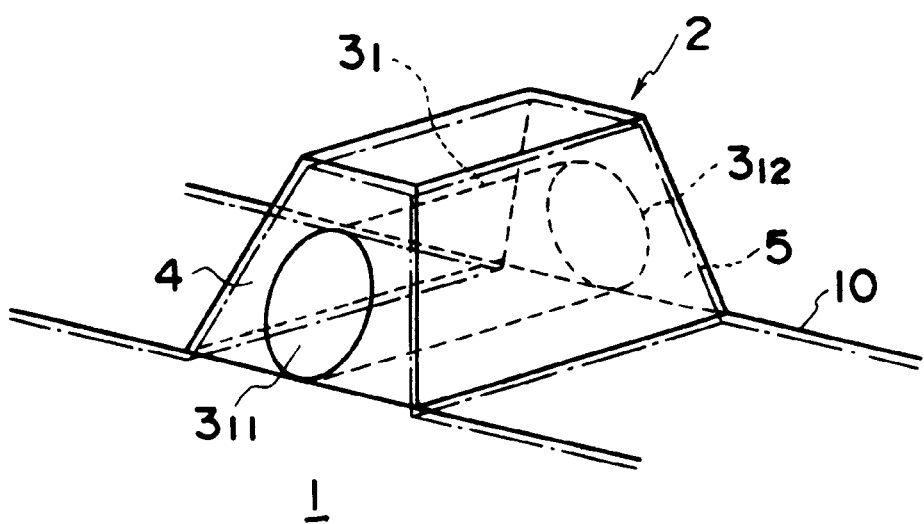
FIG. 6 is a perspective view showing a further preferred example of a rubber track according to the present invention with a guide lug and its vicinities of the rubber track being specifically shown in a taken-out state.

In each of the above-described examples, the surface of the guide lug 2 may be protected by other reinforcing materials. FIG. 6 shows a structure in that the inner surface of the rubber track and the surface of the guide lug 2 are covered by a continuous or discontinuous reinforcing canvas 10 along the longitudinal direction of the rubber track. The canvas 10 may have either crimping properties or uncrimping properties. In this example as well, the canvas is set within the mold and is adhered by vulcanization to the rubber material 1.

Figure 7:
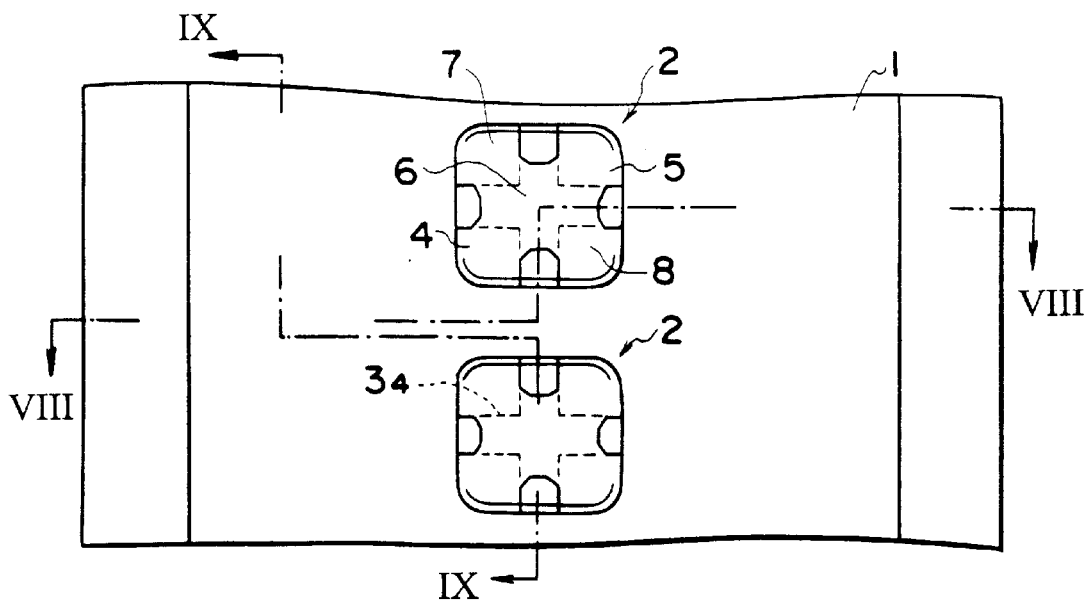
FIG. 7 shows an inner peripheral surface of a rubber track which is a fourth example of the present invention.
Figure 8:
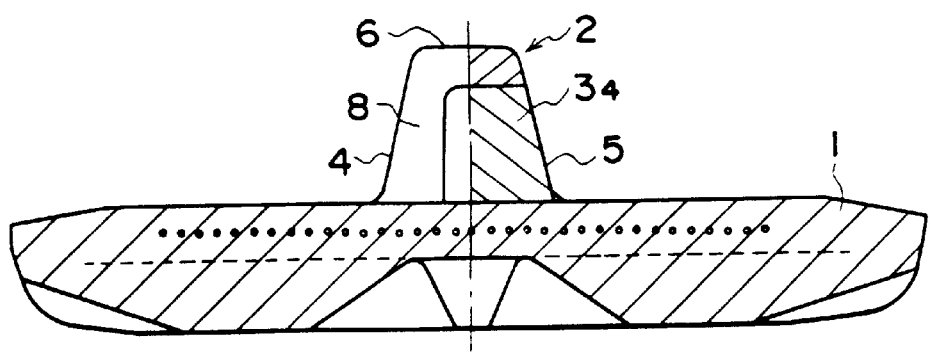
FIG. 8 is a cross sectional view taken along the lines VIII—VIII in FIG. 7.
Figure 9:
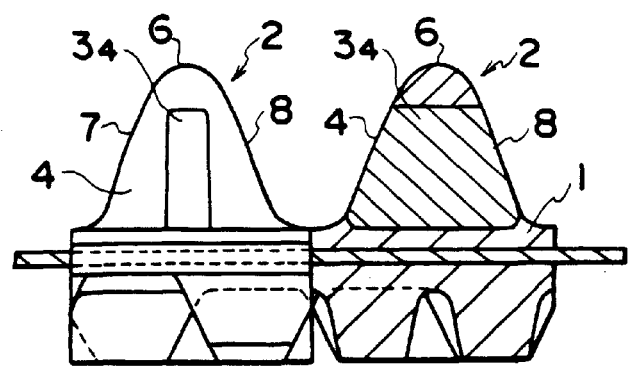
FIG. 9 is a cross sectional view taken along the lines IX—IX in FIG. 7.

FIG. 7 shows an inner peripheral surface of a rubber track according to a fourth example of the present invention, and FIGS. 8 and 9 are cross sectional views taken along the lines VIII—VIII and IX—IX in FIG. 7, respectively.

In the fourth example, a cross-shaped resin member $3_4$ (made of nylon, bakelite, or nylon 6,6) is integrated with the guide lug 2 and the surface of the resin member $3_4$ is exposed at the pairs of facing side surfaces, 4, 5 and 7, 8 and may be of course exposed at the top surface 6.

The guide lug 2 thus formed has effects in that abrasion or breakage of the guide lug 2 is prevented which is caused when contacting a sprocket in the same way as in the case in which the guide lug 2 contacts a track roller. When the resin member $3_4$ made of nylon 6,6 having Barcol hardness of 3 degrees and an Izod impact strength of 10 is used, the guide lug 2 is further effective in reduction of vibration and noise. It suffices that the resin member $3_4$ be merely set in the mold, and as occasion demands, a resin member divided into four parts may also be used.

Figure 10:
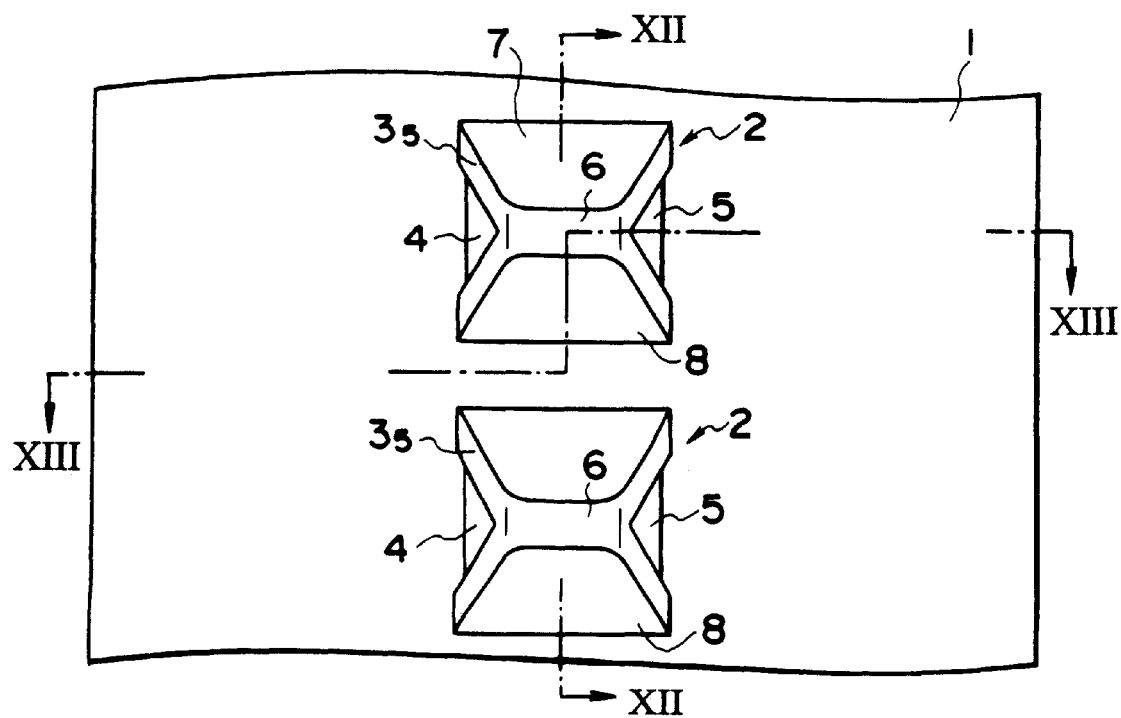
FIG. 10 shows an inner peripheral surface of a rubber track which is a fifth example of the present invention.
Figure 11:
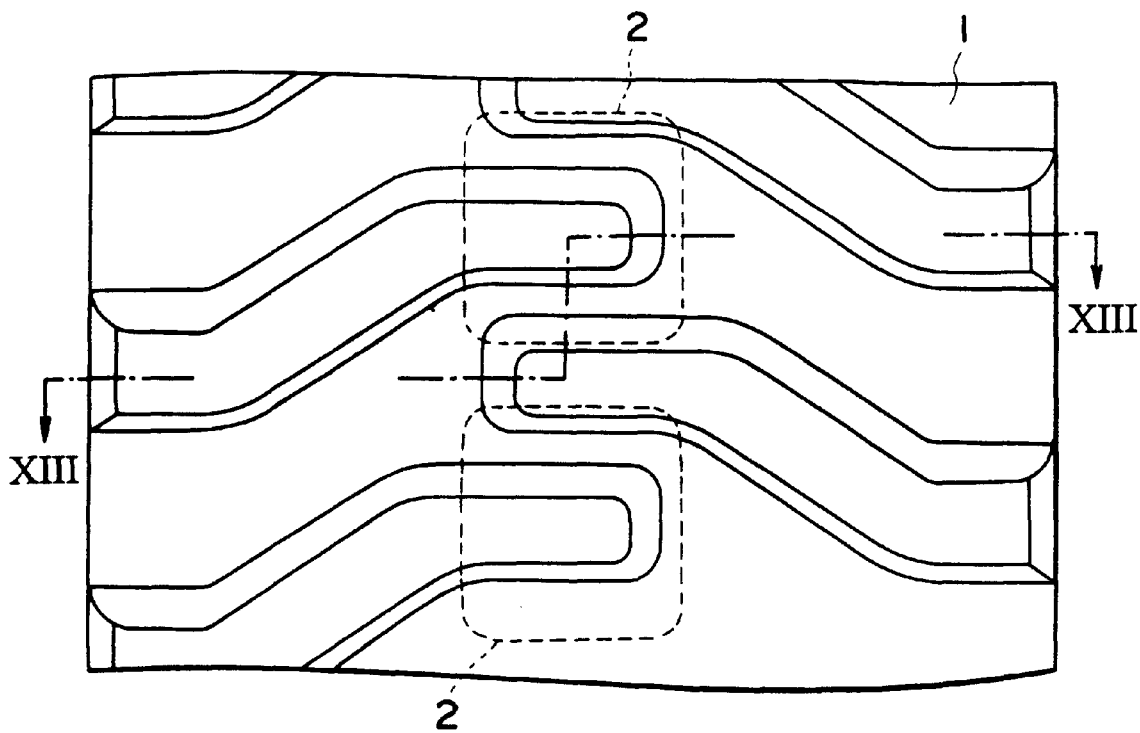
FIG. 11 is a plan view showing an outer periphery of the rubber track shown in FIG. 10.
Figure 12:
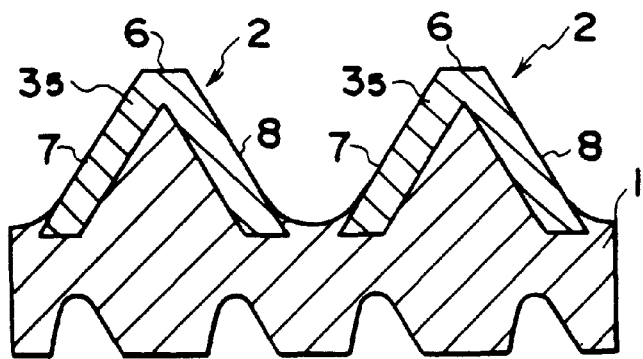
FIG. 12 is a cross sectional view of the rubber track taken along the lines XII—XII in FIG. 10.
Figure 13:
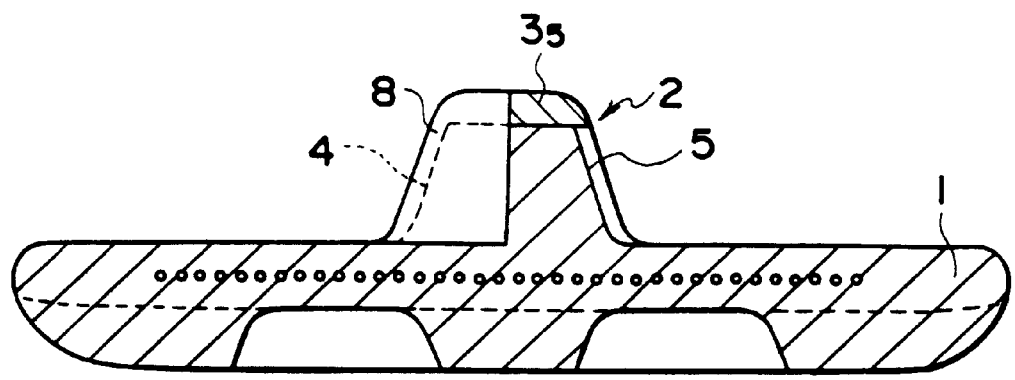
FIG. 13 is a cross sectional view of the rubber track taken along the lines XIII—XIII in FIG. 10.
Figure 14:
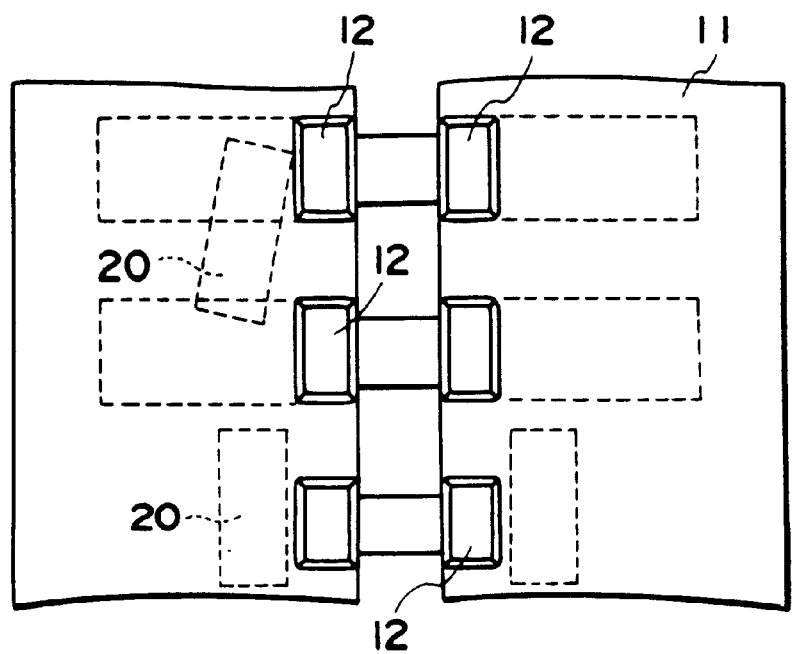
FIG. 14 shows an inner peripheral surface of a conventional rubber track with a plurality of pairs of guide lugs formed thereon.
Figure 15:
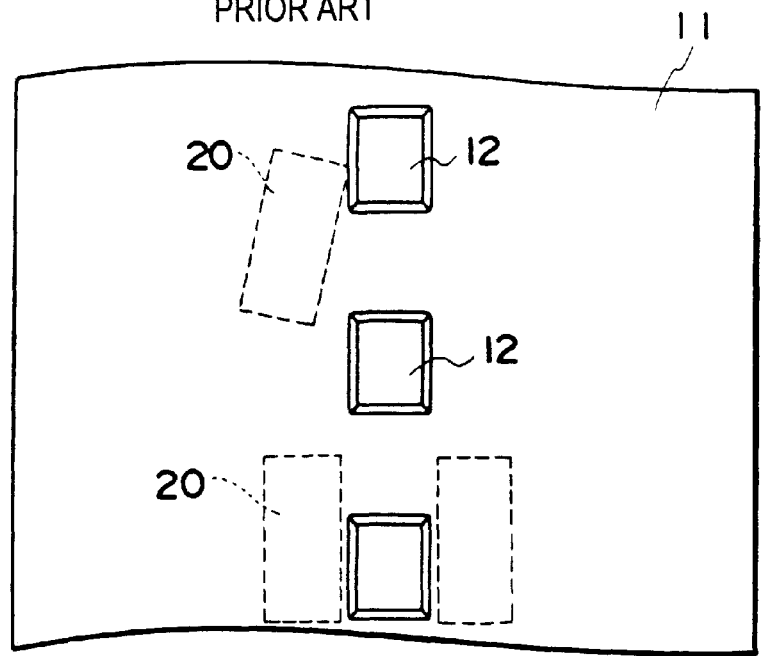
FIG. 15 shows an inner peripheral surface of another conventional rubber track with guide lugs formed thereon along a single line.
Figure 16:
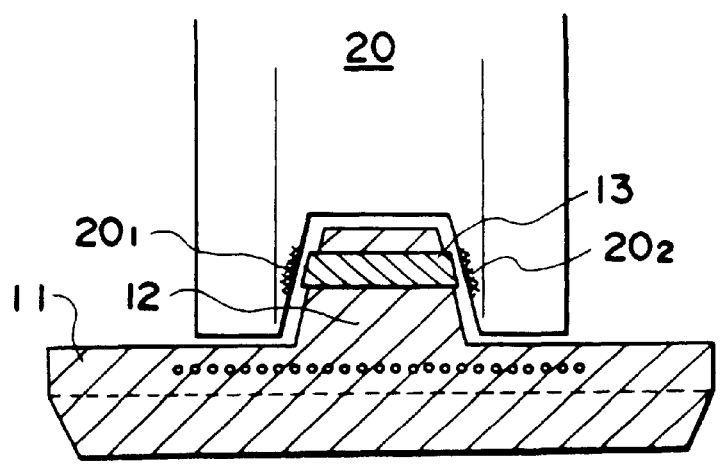
FIG. 16 shows a state in which a conventional rubber track having guide lugs formed thereon along a single line and a track roller are provided.

FIGS. 10 through 13 each show a rubber track according to a fifth example of the present invention: FIG. 10 is a plan view showing an inner peripheral surface of the rubber track; FIG. 11 is a plan view showing an outer peripheral surface thereof; FIG. 12 is a cross sectional view taken along the lines XII—XII in FIG. 10; and FIG. 13 is a cross sectional view taken along the lines XIII—XIII in FIGS. 10 and 11.

In the fifth example, resin members $3_5$ (made of nylon, bakelite, or nylon 6,6), each having a substantially V-shaped cross section configuration when seen from the transverse direction of the rubber track, are disposed on the guide lug 2 along the longitudinal direction of the rubber track. As a result, this structure exhibits extremely great effects in a case in which the guide lug 2 is rubbed against a track roller or a driving pin.

In addition, the resin member having low friction properties may also be applied to other portion of the rubber track, for example, an inner peripheral surface of the rubber track at a rolling surface of the track roller, and can also be applied to a portion in the rubber track between a pair of guide lugs. Further, as occasion demands, the low frictional resin member can also be used for a sprocket.

[Test Example I]

The feature of the present invention will be further clearly described with reference to the rubber track shown in FIG. 1.

The rubber track is formed in such a manner that rod-shaped bodies $3_1$ each having a diametrical dimension of 20 mm are respectively embedded in the guide lugs 2. The rubber material which forms each guide lug 2 is obtained by using a composition shown in Table 1 listed below. The rubber properties obtained by this composition had Hd of 82 degrees, $M_{300}$ of 130 kgf/cm², Tb of 190 kgf/cm², and Eb of 430%.

TABLE 1

| natural rubber | 80 PHR |
| --- | --- |
| 1,2 polybutadiene | 20 |
| carbon (HAF) | 60 |
| stearic acid | 2 |
| wax | 2 |
| aromatic oil | 5 |
| sulfur | 2.5 |
| vulcanization accelerator (CZ) | 1 |
| zinc oxide | 3 |

Test example 1 shows a case in which a rubber material having no resin embedded therein is used, test example 2 shows a case in which resin of ultrahigh molecular weight polyethylene (UHMW-PE) is embedded, as the rod-shaped body $3_1$, in the rubber material, and test example 3 shows a case in which resin made of polypropylene is embedded, as the rod-shaped body $3_1$, in the rubber material. In these test examples, the resin materials provided, as the rod-shaped body $3_1$, by the present invention are not used.

Test examples 4 and 5 show the cases in which heat-resisting thermoplastic resin member having low friction properties provided by the present invention is used as the rod-shaped body $3_1$: test example 4 shows a case of the rod-shaped body $3_1$ made of 6-nylon; and test example 5 shows a case of the rod-shaped body $3_1$ made of aromatic nylon.

Further, test example 6 shows a case in which a heat-resisting thermosetting resin member having low friction properties which is provided by the present invention is used as the rod-shaped body $3_1$. Namely, the rubber track of test example 6 is formed in that a cloth-inserted bakelite resin member is used as the rod-shaped body.

([Test Method I]

The test method used herein is as follows. A turning test was carried out at a speed of 25 km/hr and at a turning radius of 15 m using a vehicle in which four positive-drive type rubber tracks are installed. The conditions of the guide lugs were observed every ten minutes during the test. Further, the test method of an abrasion condition on a side surface of each guide lug was performed as follows: a width ($L_A$ mm) of the guide lug at a position of 30 mm apart from the top of the guide lug prior to the test (i.e., before the side surface of the guide lug is worn out) was measured, and after the test (i.e., after worn-out of the side surface) a width of the guide lug at the same position as the above was measured again ($L_B$ mm). As a result, a value ($L_A$–$L_B$ (mm)), becomes an amount by which the side surface of the guide lug has been worn out due to the test, which the value being set as a standard of superiority or inferiority in abrasion resistance. The above value ($L_A$–$L_B$ (mm)) were actually measured every ten minutes during the test.

[Test Results I]

The test results of the test method I are listed below in Table 2.

TABLE 2

| | Test example 1 | | Test example 2 | | Test example 3 |
| --- | --- | --- | --- | --- | --- |
| Endurance traveling time (min.) | amount of wear on side surface (mm) | side surface temperature (° C.) | amount of wear on side surface (mm) | side surface temperature (° C.) | amount of wear on side surface (mm) |
| 10 | 2.5 | 73 | 0 | 54 | 0 |
| 20 | 6.0 | 121 | 0 | 130 | 0 |
| 30 | 8.5 | 164 | 3.0 *1 | 160 | 0 |
| 40 | 11.3 | 183 | 6.3 | 186 | 2.8 *1 |
| 50 | 14.0 | 182 | 8.9 | 181 | 5.9 |
| 60 | 17.0 | 185 | 11.8 | 183 | 9.2 |

| | Test example 4 | Test example 5 | Test example 6 | |
| --- | --- | --- | --- | --- |
| Endurance traveling time (min.) | amount of wear on side surface (mm) | amount of wear on side surface (mm) | amount of wear on side surface (mm) | side surface temperature (° C.) |
| 10 | 0 | 0 | 0 | 58 |
| 20 | 0 | 0 | 0 | 125 |
| 30 | 0 | 0 | 0 | 156 |
| 40 | 0 | 0 | 0 | 180 |
| 50 | 0 | 0 | 0 | 183 |
| 60 | 0 | 0 | 0 | 175 |

*1 resin softening

As a result, in test example 1 in which no resin material abrasion of the guide lug had already started ten after the test started. Then, after sixty minutes, an abrasion of 17 mm was found in the resin.

In test example 2 in which the rod-shaped body made of ultrahigh molecular weight polyethylene was used, the resin rod softened thirty minutes after the test started, and further occurrence of abrasion was found. Then, sixty minutes after the test started, an amount of abrasion of 11.8 mm was found in the resin.

In test example 3 in which the rod-shaped body made of polypropylene was used, the resin rod softened forty minutes after the test started, and further, occurrence of abrasion was found. Then, sixty minutes after the traveling test started, an amount of abrasion of 9.2 mm was found in the resin.

However, in test examples 4, 5 in which the rod-shaped body provided by the present invention was used, even when sixty minutes have lapsed after the traveling test started, no softening of the resin used in these examples was found, and also no occurrence of abrasion was found therein.

Moreover, in test example 6 in which the rod-shaped body provided by the present invention was used, even when sixty minutes have lapsed after the traveling test started, no abrasion on the side surface of the guide lug was found. Further, the surface temperature of the guide lug exceeded 180° C. forty minutes after the test started, but no occurrence of softening was found in the resin.

[Test Example II]

Next, a test example in which a resin member whose Barcol hardness (A type) is 40 degrees or less and Izod impact strength is 2.0 or more is used as the rod-shaped body $3_1$ will be described. In test example shown below, the rubber material which forms the guide lug 2 is obtained by using the composition shown in Table 1 in the same manner as in test example I, except that both ends of the rod-shaped body $3_1$ respectively project from the side surfaces 4, 5 of the guide lug 2 by 3 mm.

For comparison, the rod-shaped body $3_1$ of a resin member not provided by the present invention, of which Barcol hardness (A type) is not 40 degrees or less and Izod impact strength is not 2.0 or more was also prepared. Most specifically, test example 7 is a resin member made of bekelite in which the rod-shaped body $3_1$ is reinforced by cloth and test example 8 is a resin member made of polyester in which the rod-shaped body $3_1$ is reinforced by glass short fibers. The Barcol hardness of each of these resin members is out of the range provided by the present invention. Further, in test example 9, an acrylic resin member was used as the rod-shaped body $3_1$ and the Izod impact strength thereof was set out of the range provided by the present invention.

Test example 10 is a resin member made of nylon 6,6 used as the rod-shaped body $3_1$, and test example 11 is a resin member made of polyacetal used as the rod-shaped body $3_1$. Both resin members used in these examples correspond to the provisions of the present invention.

Meanwhile, the Barcol hardness and Izod impact strength of the rod-shaped body $3_1$ in each test example were shown below in Table 3.

[Test Method II]

Four positive-drive type rubber tracks each having a width of 300 mm and a circumferential dimension of 3,060 mm were manufactured and installed on a vehicle. A vehicle driving test on a track shaped like the letter "8" was carried out at a speed of 30 km/hr and at a turning radius of 15 m. After the vehicle traveled for three hours, an amount of wear of the track roller, an amount of wear of the resin member, bodily-sensible vibration and noise were measured.

A guide lug formed in the rubber track is that of FIG. 1 and the track rollers are made of glass fiber reinforced nylon 6,6 which contains glass fiber by 30% (in weight).

Meanwhile, measurement of noise was performed in such a manner that during stationary traveling at a speed of 30 km/hr a noise level meter was set at a position of 1 m apart from the track rollers.

[Test Results II]

The test results of test method II are listed below in Table 3.

TABLE 3

|  | Test Example 7 | Test Example 8 | Test Example 9 | Test Example 10 | Test Example 11 |
| --- | --- | --- | --- | --- | --- |
| Barcol hardness | 60 | 53 | 2 | 3 | 1 or less |
| Izod impact strength | 13 | 74 | 1.2 | 10 | 14 |
| Endurance test Amount of wear on track roller (mm) | 1.4 | 1.8 | 0.1 | 0.1 | 0.1 |
| Amount of wear in resin (mm) | 0.2 | 0.3 | 3.1 | 0.6 | 0.7 |
| *Vibration (subjective) | x | x | ○ | ○ | ○ |
| *Noise (dB) | 78 | 80 | 66 | 69 | 64 |

○: good
x: no good

As a result of the test, in test examples 7 and 8 in which resin members whose Barcol hardness is set out of the range provided by the present invention were used, it was found that the amount of wear on the track roller was large, and the durability of the vehicle on which rubber tracks are installed was thereby affected adversely. Further, a relatively large vibration was generated and ride comfort thereby became deteriorated. Moreover, it was clearly seen from test examples 7, 8 that undesirable results on noise be obtained. In test example 9, an abraded state of the track roller was excellent and each level of vibration and noise was also low. However, an amount of wear of the resin member embedded in the guide lug was large, and it was found that this test example was not practical.

On the other hand, in test examples 10, 11 of the present invention, it can be clearly seen that an amount of wear of the track rollers is extremely small, which thereby contributes to improvement in durability of the vehicle on which the rubber tracks are installed. Further, an amount of wear of the resin member embedded in the guide lug was relatively small, thereby allowing the rubber tracks to be fit for practical use. Moreover, in the case of the resin members used in test examples 10, 11, vibration was reduced and an occurrence of noise was also extremely lessened.

The present invention has the structures described above, in which a resin member having special properties is formed in an exposed manner in a guide lug of a rubber track, the guide lug being provided to repeatedly contact and impinge upon a member provided on a vehicle body side. For this reason, even when the guide lug contacts the track roller due to disengagement therebetween, abrasion or breakage is extremely lessened and running resistance is also reduced. As a result, the life of the rubber track remarkably improves. Further, when the resin member of which Barcol hardness and Izod impact strength are set in the range provided by the present invention is used, it is possible to provide a rubber track in which vibration transmitted to an operator and noise can be reduced and which greatly contributes to an improvement in the durability of the vehicle on which the rubber tracks are installed.

While the embodiments of the present invention, as herein disclosed, constitute a preferred form, it is to be understood that other forms might be adopted.

What is claimed is:

1. A rubber track comprising:
    a plurality of rubber lugs formed on an outer peripheral surface of an endless rubber elastic body;
    a plurality of guide lugs having a top surface and side surfaces formed on an inner peripheral surface of the elastic body, the guide lugs being used for transmission of driving force or prevention of detracking between the guide lugs, and track rollers, idlers or sprockets; and
    a resin member having a rod-shaped or dumbbell-shaped configuration embedded within each of the guide lugs, said resin member being exposed only at one or more of the side surfaces of each of the guide lugs, the surface or surfaces of the guide lugs at which the resin member is exposed contacting another member, and at least upper part of the surface or each of the surfaces having a curved contour.

2. A rubber track according to claim 1, wherein said resin member is a heat-resisting thermoplastic resin member having low friction properties.

3. A rubber track according to claim 2, wherein the thermoplastic resin member having a melting point of 200° C. or higher is used.

4. A rubber track according to claim 2, wherein said resin member is made of nylon.

5. A rubber track according to claim 1, wherein said resin member is a heat-resisting thermosetting resin member having low friction properties.

6. A rubber track according to claim 5, wherein a thermosetting resin member having a thermal decomposition temperature of 200° C. or higher is used.

7. A rubber track according to claim 5, wherein said resin member is made of bakelite.

8. A rubber track according to claim 1, wherein said resin member has a Barcol harness (A type) of 40 degrees or less.

9. A rubber track according to claim 8, wherein said resin member has an Izod impact strength of 2.0 or higher.

10. A rubber track according to claim 8, wherein said resin member is selected from a group constituted from nylon 6, nylon 6,6, polyurethane, polyacetal, and polypropylene.

11. A rubber track according to claim 1, wherein the guide lug is made of rubber, and by setting said resin member within a mold for forming the rubber track and filling the mold with rubber material, said resin member and the guide lug are integrated with each other.

12. A rubber track comprising:
    a plurality of rubber lugs formed on an outer peripheral surface of an endless rubber elastic body;
    a plurality of guide lugs having a top surface and side surfaces formed on an inner peripheral surface of the elastic body, the guide lugs being used for transmission of driving force or prevention of detracking between the guide lugs, and track rollers, idlers or sprockets; and
    a heat-resisting thermoplastic resin member having low friction properties and a rod-shaped or dumbbell-shaped configuration embedded within each of the guide lugs, said resin member being exposed only at one or more of the side surfaces of each of the guide lugs, the surface or surfaces of the guide lugs at which the resin member is exposed contacting another member, and at least an upper part of the surface or each of the surfaces having a curved contour.

13. A rubber track according to claim 2, wherein the thermoplastic resin member having a melting point of 200° C. or higher is used.

14. A rubber track according to claim 12, wherein said resin member is made of nylon.

15. A rubber track comprising:
    a plurality of rubber lugs formed on an outer peripheral surface of an endless rubber elastic body;
    a plurality of guide lugs having a top surface and side surfaces formed on an inner peripheral surface of the elastic body, the guide lugs being used for transmission of driving force or prevention of detracking between the guide lugs, and track rollers, idlers or sprockets; and
    a heat-resisting thermosetting resin member having low friction properties and a rod-shaped or dumbbell-shaped configuration embedded within each of the guide lugs, said resin member being exposed only at one or more of the side surfaces of each of the guide lugs, the surface or surfaces of the guide lugs at which the resin member is exposed contacting another member, and at least an upper part of the surface or each of the surfaces having a curved contour.

16. A rubber track according to claim 15, wherein a thermosetting resin member having a thermal decomposition temperature of 200° C. or higher is used.

17. A rubber track according to claim 15, wherein said resin member is made of bakelite.

18. A rubber track comprising:
    a plurality of rubber lugs formed on an outer peripheral surface of an endless rubber elastic body;
    a plurality of guide lugs having a top surface and side surfaces formed on an inner peripheral surface of the elastic body, the guide lugs being used for transmission of driving force or prevention of detracking between the guide lugs, and track rollers, idlers or sprockets; and
    a resin member having a Barcol hardness (A type) of 40 degrees or lower and having a rod-shaped or dumbbell-shaped configuration embedded within each of the guide lugs, said resin member being exposed only at one or more of the side surfaces of each of the guide lugs, the surface or surfaces of the guide lugs at which the resin member is exposed contacting another member, and at least an upper part of the surface or each of the surfaces having a curved contour.

19. A rubber track according to claim 18, wherein said resin member has an Izod impact strength of 2.0 or higher.

20. A rubber track according to claim 18, wherein said resin member is selected from a group constituted from nylon 6, nylon 6,6, polyurethane, polyacetal, and polypropylene.

* * * * *